(12) United States Patent
Bonacci

(10) Patent No.: US 11,064,838 B2
(45) Date of Patent: Jul. 20, 2021

(54) COOKING APPARATUS

(71) Applicant: Giovanni Bonacci, Montefano (IT)

(72) Inventor: Giovanni Bonacci, Montefano (IT)

( * ) Notice: Subject to any disclaimer, the term of this patent is extended or adjusted under 35 U.S.C. 154(b) by 446 days.

(21) Appl. No.: 16/304,399

(22) PCT Filed: May 25, 2017

(86) PCT No.: PCT/EP2017/062701
§ 371 (c)(1),
(2) Date: Nov. 26, 2018

(87) PCT Pub. No.: WO2017/203014
PCT Pub. Date: Nov. 30, 2017

(65) Prior Publication Data
US 2019/0290067 A1  Sep. 26, 2019

(30) Foreign Application Priority Data

May 27, 2016  (IT) .......................... 102016000055242

(51) Int. Cl.
A47J 37/07  (2006.01)
A47J 36/38  (2006.01)
(Continued)

(52) U.S. Cl.
CPC ........... A47J 37/0722 (2013.01); A47J 36/38 (2013.01); A47J 37/0709 (2013.01);
(Continued)

(58) Field of Classification Search
CPC ................ A47J 37/0704; A47J 37/0709; A47J 37/0713; A47J 37/0722; A47J 37/0736; A47J 37/074; A47J 37/0786; A47J 36/38; H05B 3/68; F24C 15/18; F24C 15/2042

USPC ....... 99/324, 331, 339, 340, 421 R, 421 HH, 99/421 HV, 421 V, 422, 425, 427, 444, 99/445, 446, 447, 448

See application file for complete search history.

(56) References Cited

U.S. PATENT DOCUMENTS

| 3,527,154 A | 9/1970 | Shaper et al. |
| 4,034,663 A * | 7/1977 | Jenn ........................ A47J 36/38 99/446 |

(Continued)

FOREIGN PATENT DOCUMENTS

| DE | 1876620 U | 8/1963 |
| FR | 2864887 A1 | 7/2005 |

OTHER PUBLICATIONS

International Search Report for PCT/EP2017/062701.
International Preliminary Report on Patentability Chapter II or PCT/EP2017/062701.

Primary Examiner — Hung D Nguyen
(74) Attorney, Agent, or Firm — Egbert, McDaniel & Swartz, PLLC

(57) ABSTRACT

A cooking apparatus includes a heat source, a supporting device for food, a supporting frame to support the supporting device, a central edge, and two lateral edges connected to the central edge. The lateral edges have a front lower border, a front upper border and a front intermediate border that connects the front lower border with the front upper border. The supporting device for food is placed onto the front upper borders of the two lateral edges and has its lateral border in contact with the front intermediate borders of the lateral edges.

16 Claims, 6 Drawing Sheets

(51) Int. Cl.
*F24C 15/20* (2006.01)
*H05B 3/68* (2006.01)

(52) U.S. Cl.
CPC ....... *A47J 37/0786* (2013.01); *F24C 15/2042* (2013.01); *H05B 3/68* (2013.01)

(56) References Cited

U.S. PATENT DOCUMENTS

| | | | | |
|---|---|---|---|---|
| 5,176,067 | A | * | 1/1993 | Higgins .............. A47J 37/0709 99/340 |
| 5,276,307 | A | | 1/1994 | Higgins |
| 5,504,295 | A | * | 4/1996 | Collas ................ A47J 37/0709 219/432 |
| 5,524,528 | A | * | 6/1996 | Yeh ..................... A47J 37/0709 99/446 |
| 2006/0185531 | A1 | | 8/2006 | Torre |
| 2010/0089248 | A1 | * | 4/2010 | Jones ................. A47J 37/0641 99/444 |
| 2011/0283990 | A1 | | 11/2011 | Walters |
| 2013/0108750 | A1 | * | 5/2013 | Vitagliano ............... A23L 5/15 99/425 |

* cited by examiner

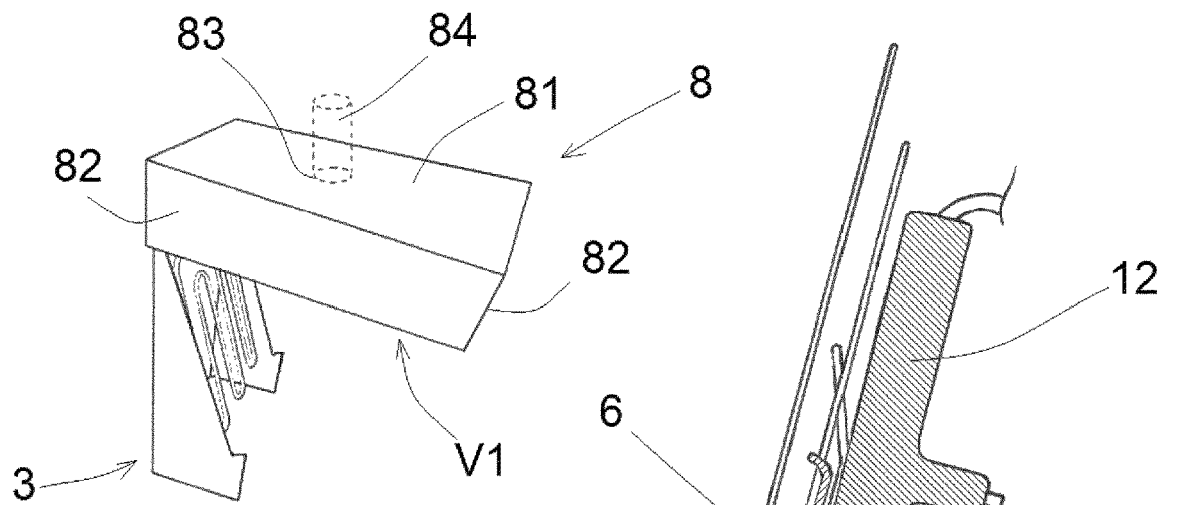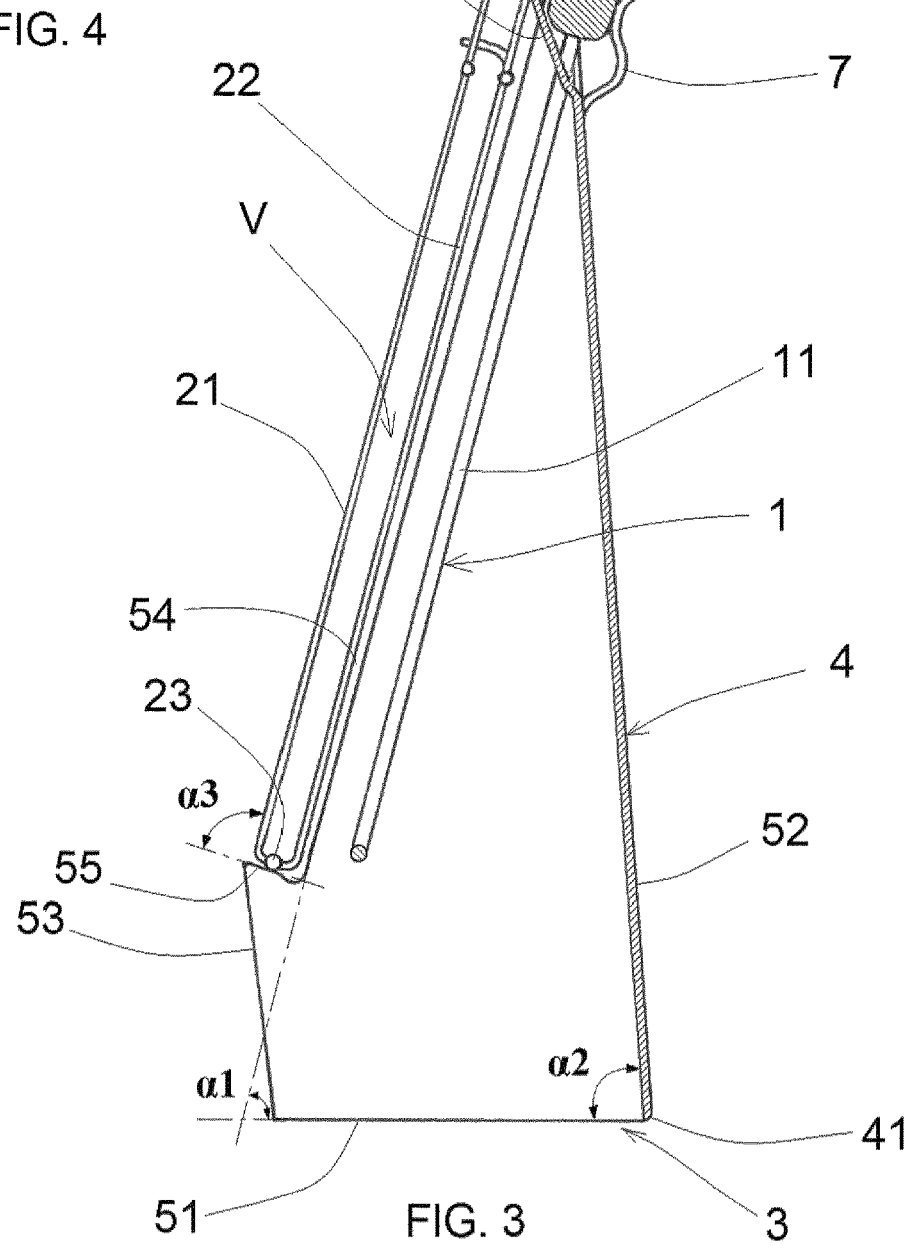

COOKING APPARATUS

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present patent application for industrial invention relates to an innovatively-conceived apparatus for cooking food, in particular grilled meat.

The peculiarities and the advantages of the present invention will be more evident after a short description of the prior art and of its relevant issues.

2. Description of Related Art Including Information Disclosed Under 37 CFR 1.97 and 37 CFR 1.98

First of all, it must be said that, in order to roast, the meat to be cooked must be exposed to a high temperature not for too long.

Such a cooking is sometimes made on charcoal in a fire place or a barbecue, in a situation in which the meat to be cooked is placed on a grill that is positioned immediately above the glowing charcoal.

Users who do not have a fireplace or a barbecue normally cook the meat on an electric grill.

Such an apparatus consists in a box body that is open on top, and provided with support feet, wherein a powerful heating element is housed in horizontal position, acting as heat source.

The additional component of a traditional electric grill is a grate intended to be horizontally positioned above the opening of said box body; in view of the above, the meat that is positioned on said grate is exposed to the high heat generated by the heating element.

Preferably the currently available electric grills are provided with the typical "double grates", which are formed of two grilled panels that are hinged on the rear borders, and provided with holding handles that protrude frontally from the front borders.

The correct use of a typical double grate provides for initially separating the two grilled panels in order to position the meat to be cooked in intermediate position between them and then close the two grilled panels, in such a way that the meat can maintain its position firmly between them.

Such a capacity of holding the meat between the two grilled panels ensures a high functional efficacy of the double grate, especially when the double grate is turned around by the user while cooking in order to alternately direct either surface of the meat to be cooked towards said heating element.

Although it is true that said horizontally-positioned electric grills are widely appreciated for their practical use and good cooking results, it is necessary to mention a drawback that is always encountered during their use.

Reference is made to the fact that fat or water tends to drip from the meat exposed to the strong heat generated by said heating element, inevitably falling on the heating element, and generating unpleasant fumes and bad odors.

It is worthless saying that such a phenomenon is generated by simple gravity, exactly because both the grate with the meat and the heating element under the grate are in horizontal position, the grate being disposed in a slightly higher position than the heating element.

In brief, such a condition cannot prevent the liquids dripping from the meat from falling on the red-hot coil of the heating element and causing the aforementioned unpleasant effects.

Although an electric grill has been described so far, the same drawbacks are also encountered when the grill comprises a different type of heat source, such as for example gas or charcoal.

U.S. Pat. No. 3,527,154A discloses an electrical cooking grill that comprises a heating coil, a cooking grid and a housing that supports the cooking grid and the heating coil in horizontal position.

US2011/0283990A1 discloses a charcoal grill comprising a vessel, a receptacle moveably disposed in the vessel and intended to contain charcoal, a cooking grate comprising a horizontal upper grate and a horizontal lower grate. The cooking grate is disposed in the vessel above the receptacle in horizontal position.

The U.S. Pat. No. 3,527,154A and US2011/0283990A1 priority documents disclose a cooking grate disposed in horizontal position above the heat source. Such position of the cooking grate makes the grease fall onto the heat source (electric grill or charcoal). Consequently, U.S. Pat. No. 3,527,154A and US2011/0283990A1 are impaired by the technical drawback of generating fumes and bad odors because of the fat that drips on the heat source.

U.S. Pat. No. 5,276,307 discloses an outdoor grill comprising a base with an upper opening, a heating element disposed in lower position in the base and provided with an annular shape, a drip tray supported by the base, and a cooking grill disposed above the drip tray and supported by the base. Such a cooking grill is disposed along a horizontal plane. The U.S. Pat. No. 5,276,307 priority document solves the problem of the fat dripping on the electric grill using an annular heating element in such a way that the fat can drip inside the annular shape without touching the heating element. However, U.S. Pat. No. 5,276,307 is impaired by some drawbacks in terms of cooking. As a matter of fact, the annular heating element does not guarantee a uniform cooking of the food disposed on the cooking grill.

U.S. Pat. No. 5,176,067 discloses an indoor grill comprising a base with an upper opening, a reflector positioned within the base and supported by the base, a heating element disposed in the reflector, in such a way that the base and the reflector support the heating element, a cooking grill supported by the base above or under the heating element in horizontal position. The U.S. Pat. No. 5,176,067 document solves the problem of the fat dripping on the heating element by using a cooking grill that can be disposed under the heating element. However, U.S. Pat. No. 5,176,067 is impaired by the fact that the positioning of the cooking grill under the heating element is complicated and not very practical, making it difficult to turn the meat around while cooking.

The purpose of the present invention is to disclose a cooking apparatus that allows for cooking the food uniformly, in a practical and easy way, thus preventing the generation of fumes and bad odors.

Another purpose is to disclose a cooking apparatus according to the invention wherein the distance between the food and the heat source can be adjusted.

Another purpose is to disclose a kitchen extractor hood that is internally provided with the cooking apparatus.

BRIEF SUMMARY OF THE INVENTION

The idea of the present invention is to provide a cooking apparatus intended to operate not in a horizontal position, but in a sub-vertical upright position, that is to say in an inclined position with respect to a vertical plane.

In such a case, a similar upright position is given both to the heat source and to the grill intended to support the meat to be exposed to the heat generated by the heat source.

The fact that the grill of the new cooking apparatus no longer operates in an overlapped position with respect to the heat source—as in traditional horizontal grills—but in the front of the heat source has permitted to achieve the aforementioned purpose.

In fact, because of the upright position of the heat source and of the grill, the cooking liquids that inevitably drip from the meat cannot fall by gravity onto the heat source in view of the fact that the heat source is no longer positioned under the cooking grill.

Within such a solution, the additional purpose of the present invention is to provide the cooking apparatus of the invention with a lean, light-weighed, inexpensive and easy to make structure.

Additional advantages are obtained from the optional characteristics of the invention that are the object of the depending claims, which are to be considered as an integral part of the present description.

The cooking apparatus of the invention is defined in claim 1.

Such a structure of the supporting frame prevents the grease that drips from the meat supported by the supporting device from falling on the heat source and from generating fumes and bad odors.

BRIEF DESCRIPTION OF THE SEVERAL VIEWS OF THE DRAWINGS

For the sake of clarity, the description of the cooking apparatus of the invention continues with reference to the attached drawings, which have a merely illustrative, not limiting value, wherein:

FIG. 3 is a diagrammatic side view of the cooking apparatus according to the invention sectioned with a vertical plane passing through the holding handle of the heat source;

FIG. 4 is a diagrammatic axonometric view of the cooking apparatus of the invention according to a second embodiment;

DETAILED DESCRIPTION OF THE INVENTION

Figure 1:
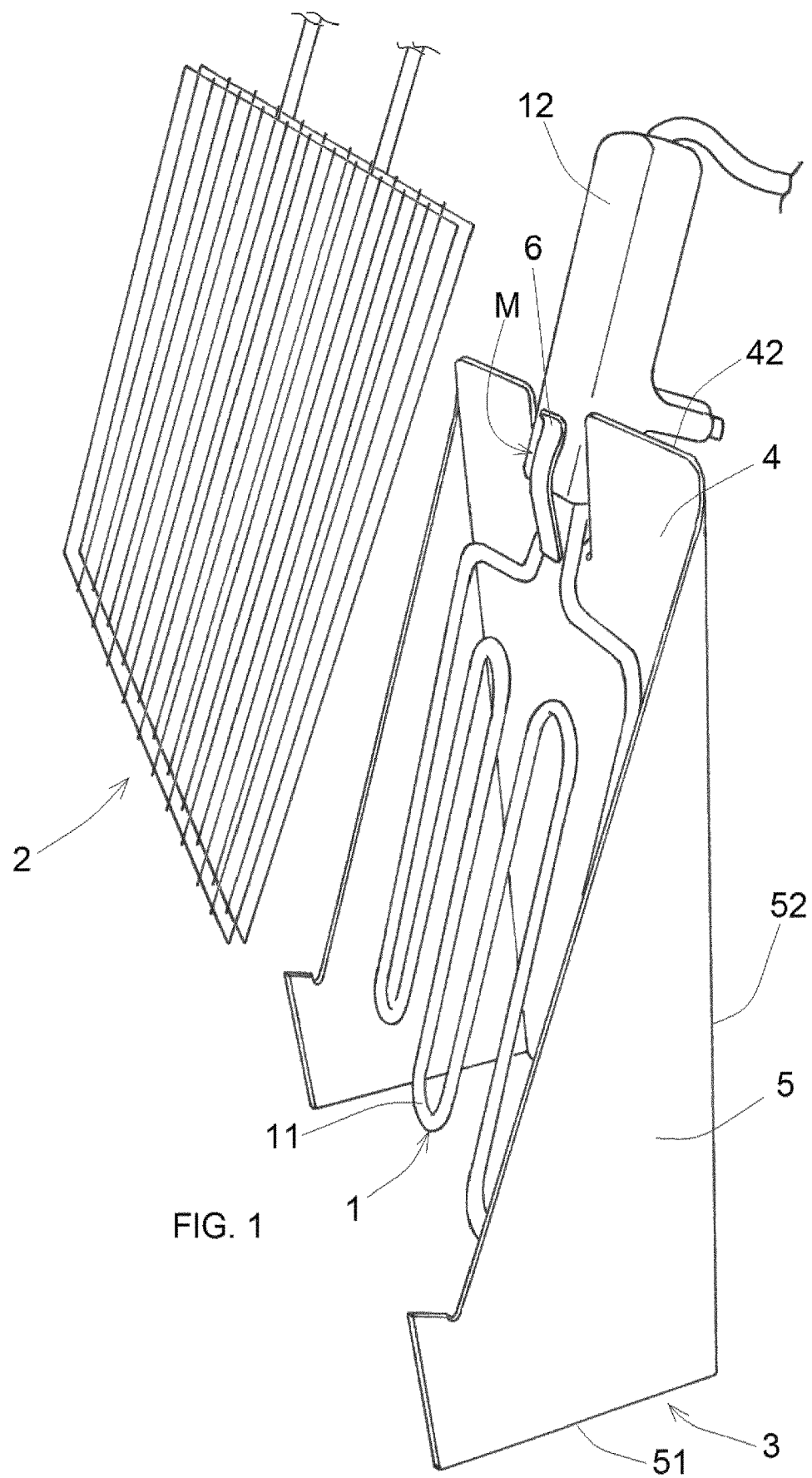
FIG. 1 is an exploded axonometric view of the cooking apparatus of the invention.

With reference to FIG. 1, the cooking apparatus according to the invention comprises:

a heat source (1); in particular, said heat source (1) is an electric grill comprising a coil (11) and a holding handle (12);

a supporting device (2) for food;

a supporting frame (3) for supporting both the electric grill and the supporting device (2) for food.

Figure 2:
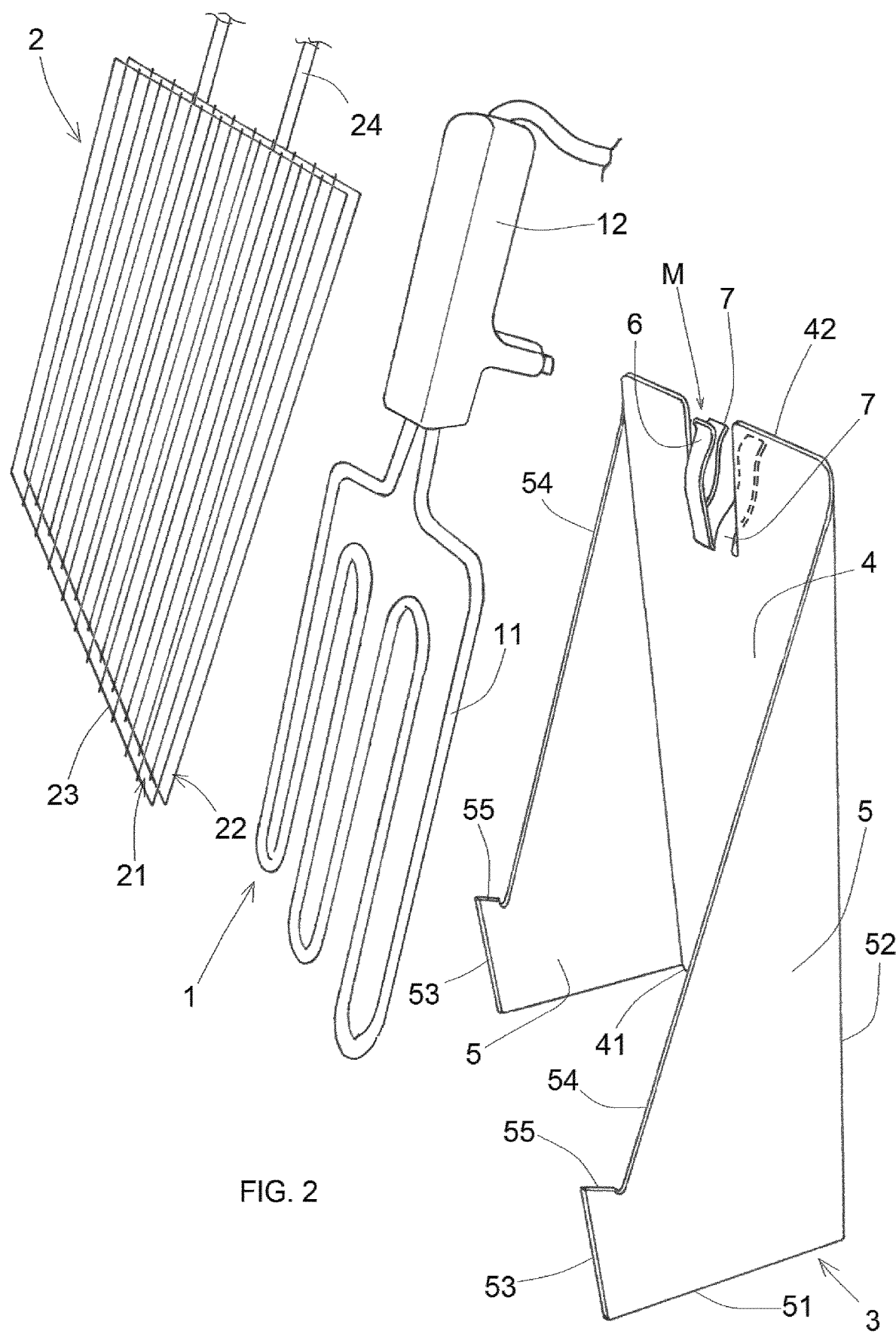
FIG. 2 is an axonometric view of the supporting frame while it supports the heat source.

Said supporting device (2) is traditional and is composed of two grills (21,22) that define a compartment (V) where to place the food to be cooked; said supporting device (2) comprises a lateral border (23) and a holding handle (24), as shown in FIGS. 1 and 2.

With reference to FIGS. 2 and 3, said supporting frame (3) comprises:

a central wall (4) comprising a lower border (41) and an upper border (42);

two lateral walls (5) connected to said central wall (4); said lateral walls (5) comprise a lower supporting border (51) and a back vertical border (52) connected to said central edge (4); said lateral edges (5) also comprise a front lower border (53), a front upper border (54) and a front intermediate border (55) connecting said front lower border (53) with said front upper border (54).

It must be noted that, while cooking the food, the supporting device (2) for food is placed onto the front upper borders (54) of the two lateral edges (5) and has its lateral border (23) in contact with the front intermediate borders (55) of the lateral walls (5), as shown in FIG. 3.

Still with reference to FIG. 3, the cooking apparatus according to the invention has some special geometries that achieve the aforementioned purposes, and namely:

said front upper border (54) of the lateral walls (5) is inclined with respect to the lower supporting border (51) by an angle ($\alpha 1$) comprised between 64° and 77°, preferably 70°;

said lower supporting border (51) of the lateral walls (5) is inclined with respect to the back vertical border (52) by an angle ($\alpha 2$) comprised between 84° and 88°, preferably 86°;

said front upper border (54) of the lateral walls (5) is inclined with respect to the lower supporting border (55) by an angle ($\alpha 1$) comprised between 90° and 80°, preferably 90°.

With reference to FIGS. 1 and 2, the cooking apparatus comprises supporting means (M) for the electric grill, provided on the upper border (42) of the central wall (4). Said supporting means (M) consist in flexible tongues that support the holding handle (12) of the electric grill.

More precisely, said supporting means (M) comprise one front central tongue (6) and two back lateral tongues (7).

As shown in FIG. 1, said front central tongue (6) cooperates with the upper surface of the holding handle (12) and said two back lateral tongues (7) cooperate with the lower surface of the holding handle (12).

The supporting frame (3) of the invention is also suitable for being used with traditional electric grills that normally comprise a safety button that enables the switching-on of the electric grill when the electric grill is in operating position, that is to say it is placed correctly onto a supporting frame; for this reason, said front central tongue (6) is shaped in such a way to press said safety button when the electric grill is correctly placed on the supporting frame (3) in operating position.

According to a second embodiment, which is diagrammatically shown in FIG. 4, the cooking apparatus of the invention comprises a box frame (8) comprising a central wall (81) and four lateral walls (82) perpendicular to said central wall (81).

Said box frame (8) comprises a compartment (V1) defined by said central wall (81) and by four lateral walls (82); said compartment (V1) has suitable dimensions in order to contain the supporting frame (3), in such a way that, when the cooking apparatus is not used, the supporting frame (3) is contained inside said box frame (8).

According to a preferred embodiment, moreover, said box frame (8) is hinged on the upper border (42) of the central wall (4) of the supporting frame (3) and can be:

in an idle position (not shown in the attached figures), wherein the supporting frame (3) is contained inside the compartment (V1) of the box frame (8);

in an operating position, wherein it is disposed with its central wall (81) in a substantially perpendicular position with respect to the central wall (4) of the supporting frame (3), as shown in FIG. 4.

Still with reference to FIG. 4, said central wall (81) has a hole (83) intended to let the cooking fumes pass through.

Advantageously, said box frame (8) can be provided, in correspondence of said hole (83), with means (84) intended to put said hole (83) in communication with extracting means of the cooking fumes; said means (84) are diagrammatically represented in FIG. 4 with a connection nozzle whereon a preferably flexible hose can be connected, upstream of which an extracting device such as the one provided in a kitchen extractor hood is installed.

Said box frame (8) may comprise locking means in order to be locked in operating position; said means may consist at least in an automatic button intended to cooperate in a hole in such a way to be elastically released as soon as it is aligned with said hole, or in a pair of toothed crowns provided with a spring that pushes one crown against the other.

Finally, it must be noted that the supporting frame (3) is monolithic and said central wall (4), the supporting means (M) and said lateral walls (5) are made in one piece from a sheet metal that is first cut and then bent in correspondence of both the back vertical border (52) of the lateral walls (5) and the flexible tongues (6,7).

Figure 5:
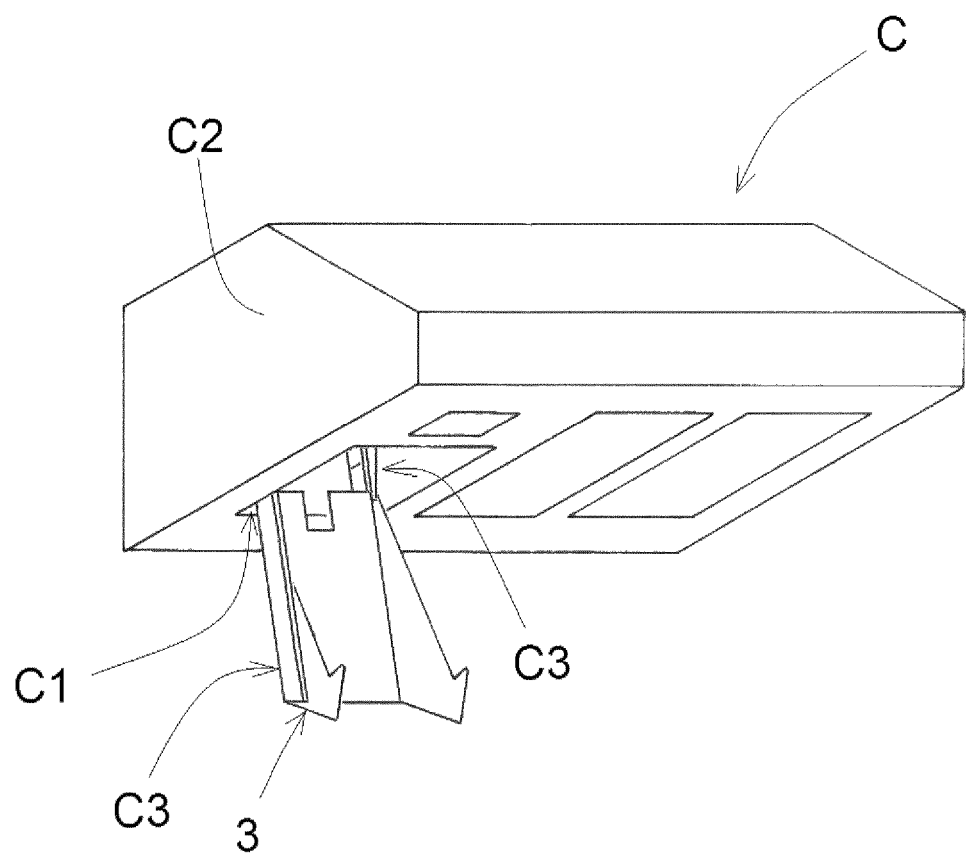
FIG. 5 is a diagrammatic axonometric view of a hood according to the invention comprising the cooking apparatus of FIG. 1.

FIG. 5 shows a kitchen extractor hood according to the invention, indicated with reference letter (C) and comprising the cooking apparatus of the invention.

The hood (C) comprises a frame (C2) that defines a compartment, intended to house the cooking apparatus, and provided with a lower opening (C1) used to access the compartment, through which the cooking apparatus can pass in order to protrude from the compartment or to be inserted in the compartment of the frame (C2).

The hood (C) also comprises a pair of guides (C3) connected to the cooking apparatus and to the frame (C2) to make the cooking apparatus slide with respect to the frame (C2) in order to introduce or extract the cooking apparatus into or from the compartment of the frame (C2) through the opening (C1). Each guide (C3) comprises a first element fixed to the frame (C2) in correspondence of the opening (C1) and disposed inside the compartment, and a second element slidably mounted on the first element. The second element is fixed to the cooking apparatus, in such a way that, by moving the second element with respect to the first element, the cooking apparatus can be extracted from the compartment or can be inserted end in the compartment of the frame (C2). Advantageously, said guides (C3) have a substantially vertical position.

Figure 6:
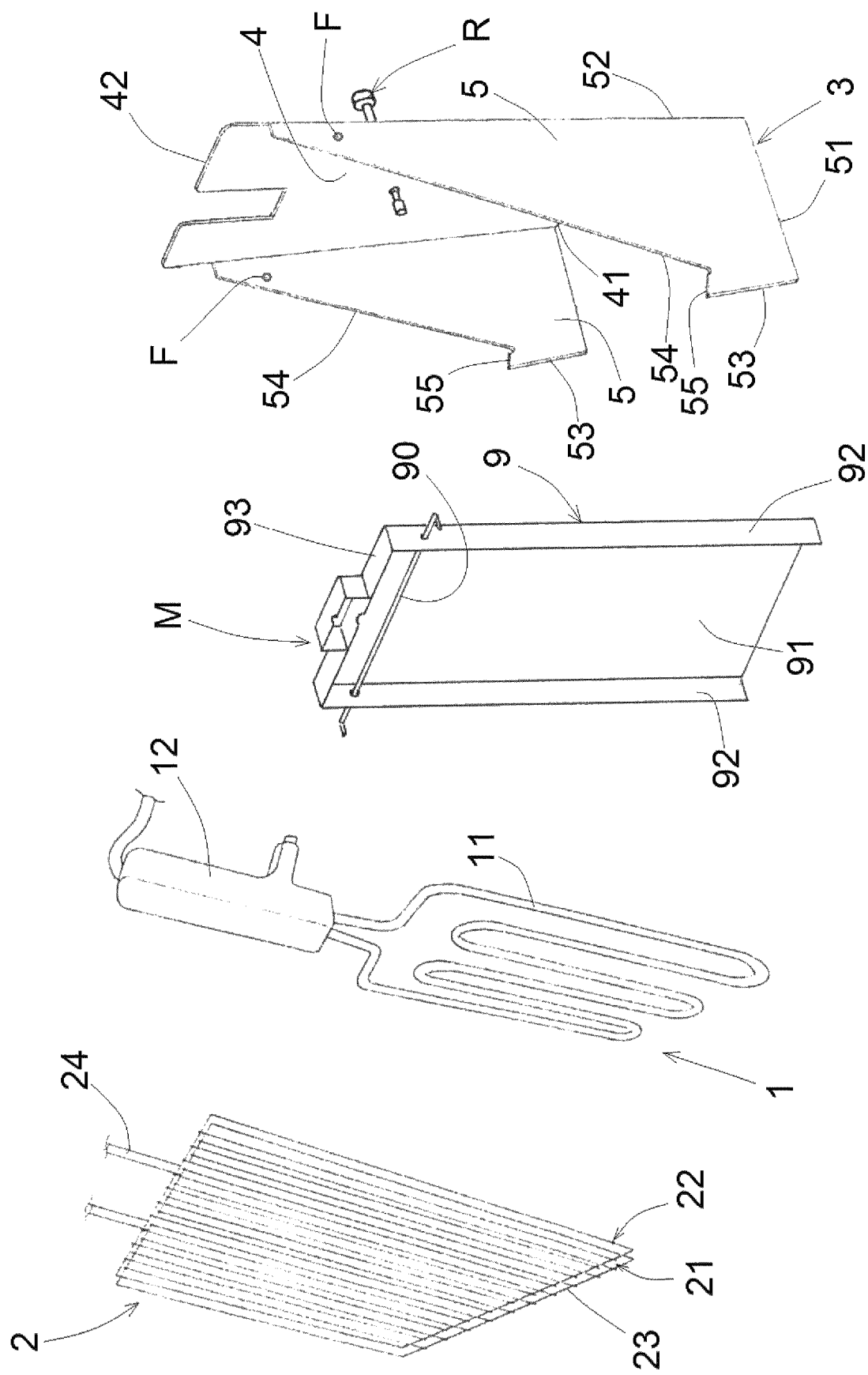
FIG. 6 is an axonometric exploded view of a third embodiment of the cooking apparatus of the invention.
Figure 7:
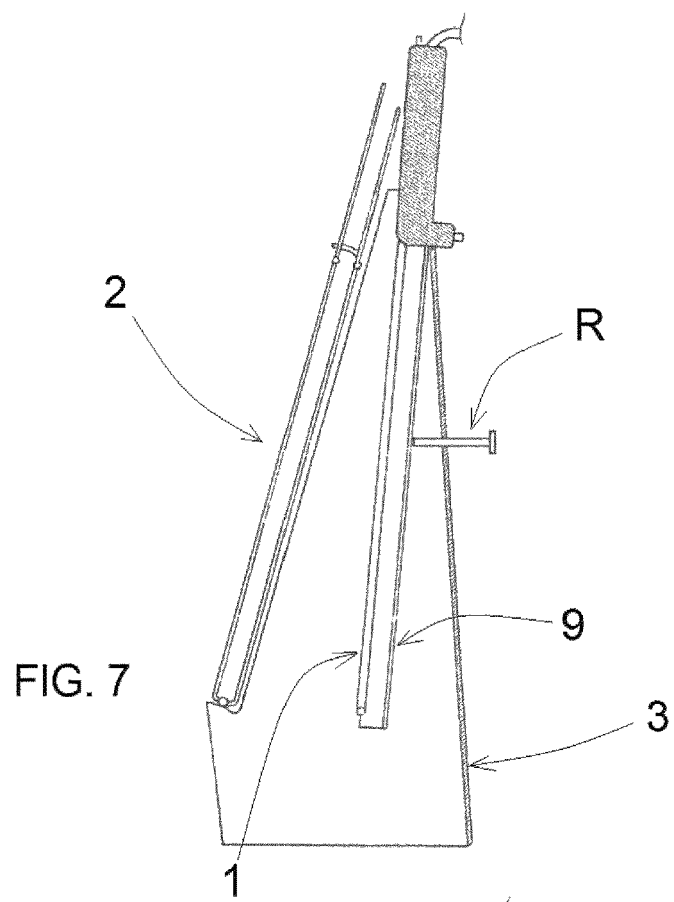
FIG. 7 is a diagrammatic side view of the cooking apparatus of FIG. 6 sectioned with a vertical plane passing through the holding handle of the heat source.
Figure 8:
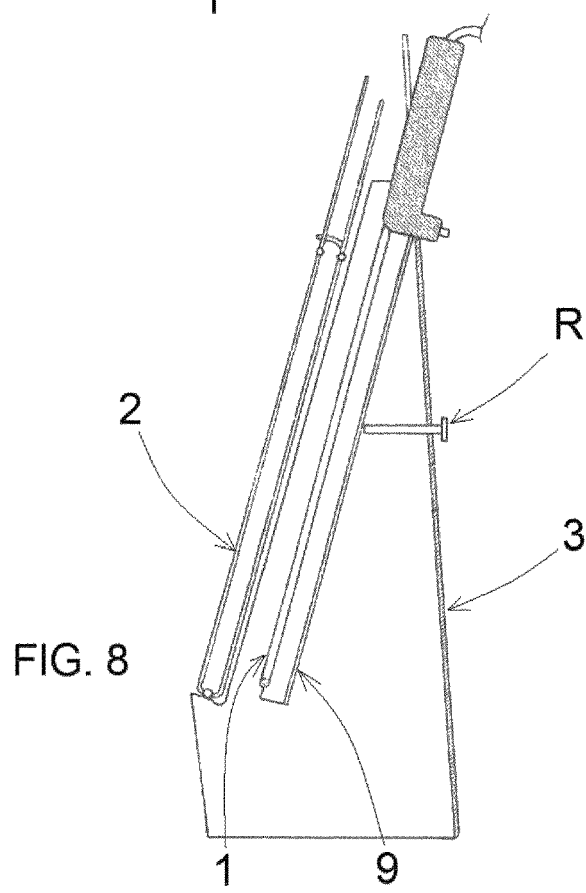
FIG. 8 is the same as FIG. 7, except for it shows a back-piece of the cooking apparatus according to the present invention with a different inclination with respect to a vertical axis.

FIGS. 6 to 8 show a third embodiment of the cooking apparatus according to the invention. In the following description the parts that are identical or correspond to the parts described above are identified with the same numerals, omitting their detailed description.

The cooking apparatus comprises a supporting element (9) disposed between the heat source (1) and the supporting frame (3).

The supporting element (9) comprises a substantially vertical back wall (91) with rectangular shape, two lateral walls (92) and one upper wall (93).

The supporting element (9) is hinged in upper position to the lateral walls (5) of the supporting frame (3) by means of a pin (90) inserted in holes (F) obtained on said lateral walls (5). Because of the supporting element (9), on one side the overheating of the frame (3) can be prevented, and on the other side the heat can be completely concentrated towards the supporting device (2) intended to contain the food to be cooked.

It must be noted that according to said third embodiment the supporting means (M) for the electric grill are provided on the supporting element (9), in correspondence of the upper wall (93). In view of the above, the supporting element (9) supports the electric grill. Advantageously, the supporting means (M) comprise a compartment wherein a portion of the holding handle (12) of the electric grill is inserted. The supporting means (M) are configured in such a way to press the safety button of the electric grill.

Alternatively, the support means (M) comprise flexible tongues.

The cooking apparatus comprises adjustment means (R) provided on the supporting frame (3) in order to adjust the distance between the supporting frame (3) and the supporting element (9) and, consequently, the distance between the heat source (1) and the supporting device (2) that supports the food to be cooked. Said adjustment means (R) comprise a screw that is screwed into a threaded hole obtained on the central wall (4) of the supporting frame (3).

The screw comprises a first end that is intended to be moved in order to tighten/untighten the screw inside the threaded hole and a second end that is disposed in contact with the back wall (91) of the supporting element (9). As shown in FIGS. 7 and 8, the tightening or untightening of the screw moves the supporting element (9), and consequently the heat source (1), closer or farther with respect to the supporting device (2) for food, which is placed on the front upper border of the lateral walls (5). In view of the above, the food can be exposed to a higher or lower heat.

Although it is not shown in the figures, the supporting element (9) can be a receptacle that comprises a compartment, intended to contain a gas supply device or charcoal. In such a case, the heat source (1) is the charcoal or the gas supply device. Advantageously, a front wall of the supporting element (9) is provided with openings to let the heat out of the compartment of the supporting element (9).

The invention claimed is:

1. A cooking apparatus comprising:
   a heat source;
   a supporting device for food; said supporting device being composed of two grills that define a compartment where the food to be cooked is placed said supporting device comprising a lateral edge and a holding handle;
   a supporting frame supporting said supporting device, said supporting frame comprising:

a central wall disposed in a substantial vertical position, said central wall comprising a lower border and an upper border;

two lateral walls connected to said central wall and disposed orthogonal with respect to said central wall, each of the two lateral walls comprising:
  a lower supporting edge adapted to be placed on a horizontal surface;
  a back vertical edge connected to said central wall;
  a front lower border;
  a front upper border; and
  a front intermediate border connecting said front lower border with said front upper border, wherein said front upper border is inclined with respect to said lower supporting edge by an angle ($\alpha1$) of between 64° and 77°, wherein said front upper border is inclined with respect to the front intermediate border by an angle ($\alpha3$) of between 80° and 90°, wherein said heat source is an electric grill and the cooking apparatus further comprises supporting means for supporting said electric grill between said two lateral walls of said supporting frame, wherein said supporting device is placed onto the front upper borders of said two lateral walls and the lateral edge of said supporting device being in contact with the front intermediate borders of the two lateral walls so that the two grills of said supporting device are inclined of an angle of between 64° and 77° with respect to the horizontal surface.

2. The cooking apparatus of claim 1, wherein said lower supporting edge of the two lateral walls is inclined with respect to the back vertical edge by an angle ($\alpha2$) of between 84° and 88°.

3. The cooking apparatus of claim 1, wherein said central wall and said two lateral walls are made in one piece from a sheet metal that is first cut and then bent in correspondence to the back vertical edge of the two lateral walls.

4. The cooking apparatus of claim 1, wherein the supporting means comprises a compartment wherein a portion of the holding handle of the electric grill is inserted.

5. The cooking apparatus of claim 1, wherein the supporting means has flexible tongues that support the holding handle of the electric grill.

6. The cooking apparatus of claim 5, wherein the supporting means comprises a front central tongue and two back lateral tongues, said front central tongue cooperating with an upper surface of the holding handle and said two back lateral tongues cooperating with a lower surface of the holding handle.

7. The cooking apparatus of claim 1, wherein said electric grill comprises a safety button that enables a switching-on of the electric grill.

8. The cooking apparatus of claim 1, further comprising:
a supporting element disposed between said heat source and said supporting frame so as to support said heat source.

9. The cooking apparatus of claim 8, further comprising:
an adjustment means on said supporting frame for adjusting a distance between said supporting frame and said supporting element.

10. The cooking apparatus of claim 9, wherein said adjustment means comprises a screw that is tightened into a threaded hole on the central wall of said supporting frame.

11. The cooking apparatus of claim 8, wherein said supporting element comprises a pin that hinges said supporting element to said supporting frame, said pin being inserted into holes on the two lateral walls of said supporting frame.

12. The cooking apparatus of claim 8, wherein the supporting means are positioned on said supporting element.

13. The cooking apparatus of claim 1, wherein the supporting means are positioned in correspondence to the upper border of said central wall.

14. The cooking apparatus of claim 1, further comprising:
a box frame having a central wall and four lateral walls perpendicular to said central wall, said box frame having a compartment defined by the central wall and by the four lateral walls, the compartment being dimensioned to contain said supporting frame, said box frame being hinged on the upper border of said central wall of said supporting frame and adapted to be placed in an idle position, wherein said supporting frame is contained inside the compartment of said box frame, and is in an operating position disposed with the central wall in a substantially perpendicular position with respect to the central wall of said supporting frame, the central wall of said box frame having a hole adapted to let the cooking fumes pass through.

15. An extractor hood comprising:
a cooking apparatus comprising:
  a heat source;
  a supporting device for food; said supporting device being composed of two grills that define a compartment where the food to be cooked is placed; said supporting device comprising a lateral edge and a holding handle;
  a supporting frame supporting said supporting device, said supporting frame comprising:
    a central wall disposed in a substantial vertical position, said central wall comprising a lower border and an upper border;
    two lateral walls connected to said central wall and disposed orthogonal with respect to said central wall, each of the two lateral comprising:
      a lower supporting edge adapted to be placed on a horizontal surface;
      a back vertical edge connected to said central wall;
      a front lower border;
      a front upper border; and
      a front intermediate border connecting said front lower border with said front upper border, wherein said front upper border is inclined with respect to said lower supporting edge by an angle ($\alpha1$) of between 64° and 77°, wherein said front upper border is inclined with respect to the front intermediate border by an angle ($\alpha3$) of between 80° and 90°, wherein said heat source is an electric grill and the cooking apparatus further comprises supporting means for supporting said electric grill between said lateral walls of said supporting frame, wherein said supporting device is placed onto the front upper borders of said two lateral walls and the lateral edge of said supporting device being in contact with the front intermediate borders of the two lateral walls so that the two grills of said supporting device are inclined of an angle of between 64° and 77° with respect to the horizontal surface;
  a frame comprising a compartment and an opening that provides access to the compartment;

at least one guide connected to said cooking apparatus and to said frame in order to move said cooking apparatus with respect to said frame in order to introduce or extract said cooking apparatus into or from the compartment of said frame through the opening.

16. The extractor hood of claim 15, wherein said at least one guide comprises a first element fixed to said frame and disposed inside the compartment and a second element slidably mounted on the first element, said second element being fixed to said cooking apparatus.

\* \* \* \* \*